Sept. 9, 1958  T. D. COPELAND, JR  2,850,836
DUST SPRAYING APPARATUS
Filed Oct. 26, 1953  4 Sheets-Sheet 1

INVENTOR.
T. D. Copeland Jr.

Sept. 9, 1958     T. D. COPELAND, JR     2,850,836
DUST SPRAYING APPARATUS
Filed Oct. 26. 1953     4 Sheets-Sheet 2
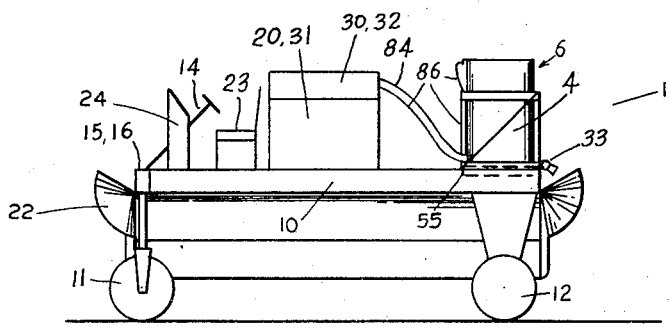
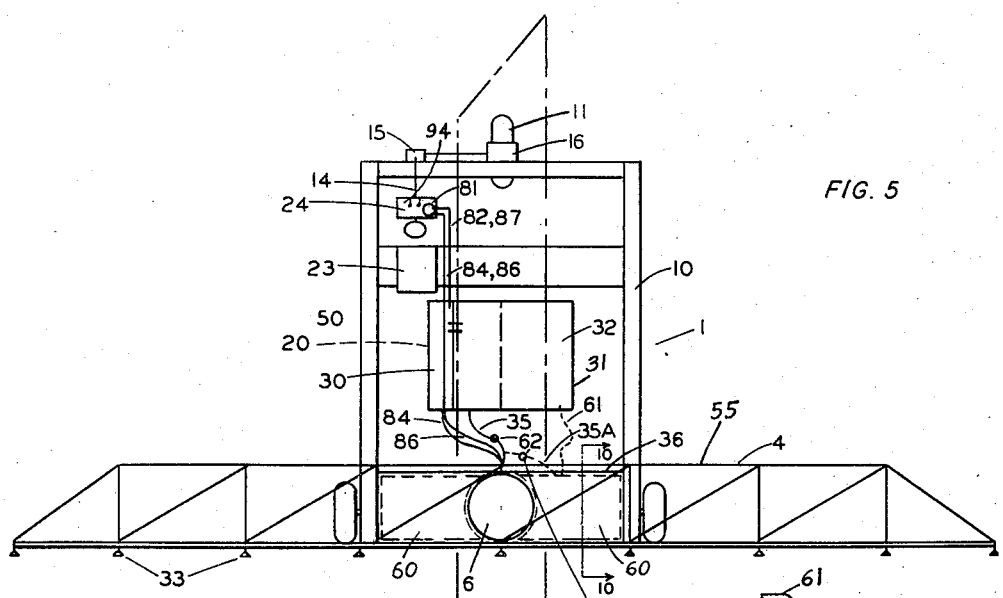
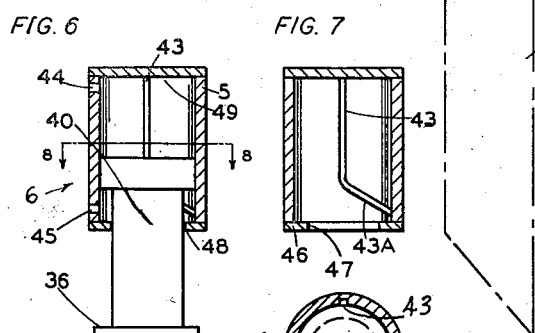
INVENTOR.
T. D. Copeland Jr.

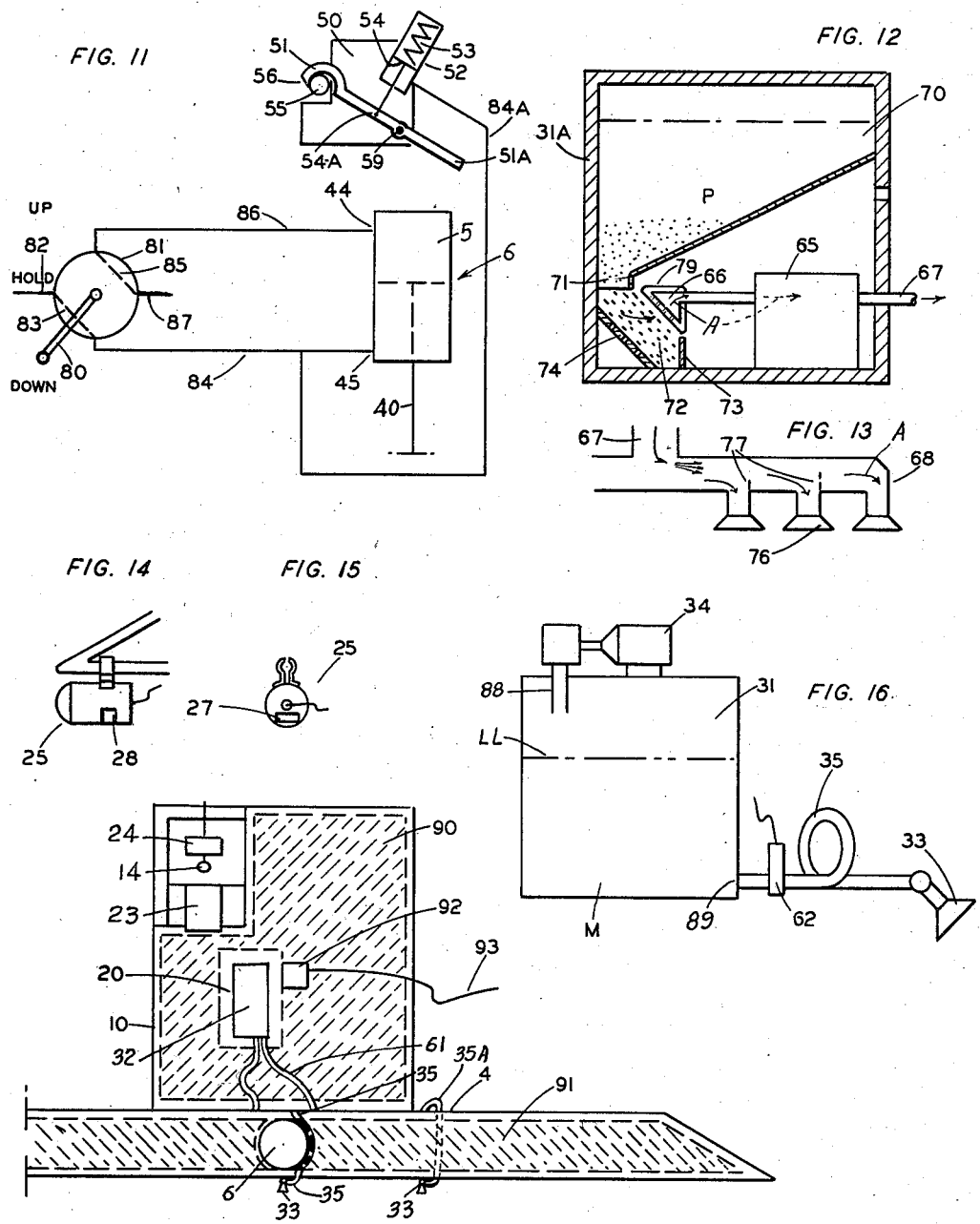

Sept. 9, 1958  T. D. COPELAND, JR  2,850,836
DUST SPRAYING APPARATUS
Filed Oct. 26, 1953  4 Sheets-Sheet 4
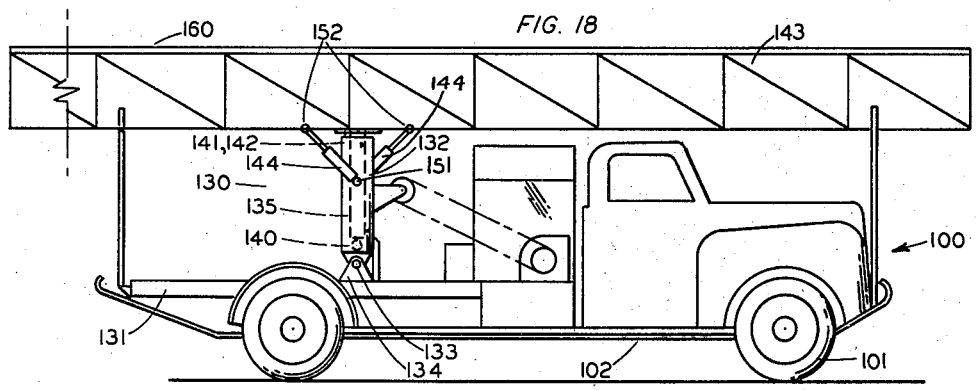
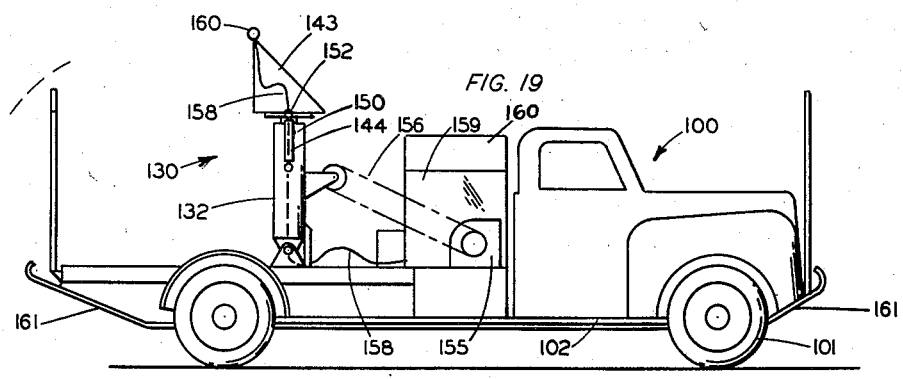
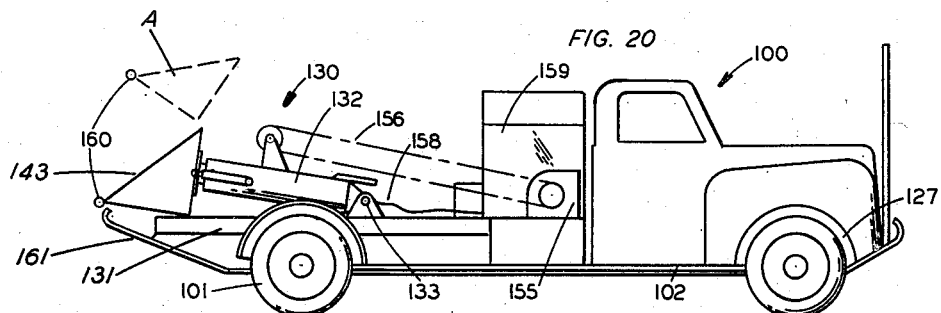
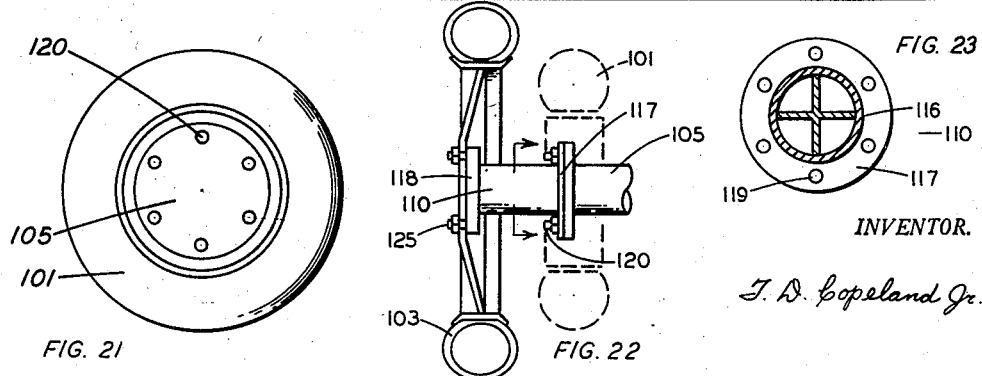
INVENTOR.
T. D. Copeland Jr.

United States Patent Office 2,850,836
Patented Sept. 9, 1958

2,850,836

DUST SPRAYING APPARATUS

Thomas D. Copeland, Jr., Garland, Tex.

Application October 26, 1953, Serial No. 392,243

14 Claims. (Cl. 43—147)

This invention relates to apparatus employed primarily for the purpose of spraying insecticide on farm crops.

The primary object of this invention is to provide an apparatus which will distribute insecticide over a very wide area of furrows when the machine is in the field, and which apparatus may be made to occupy a very narrow area when the machine is travelling on a road or highway.

Another object is to provide a device with which farm crops may be sprayed in extremely large areas and at varying heights, and yet a device which is suitable for highway travel without dismantling.

A further object is to provide a device by which farm crops may be sprayed on the ground with greater accuracy and infinitely greater safety than airplane dusting.

A still further object is to provide an apparatus which includes an extremely long rigid dust nozzle rack, which, during operation is turned crosswise of the vehicle on which it is carried for greater crop coverage, and which rack is turned lengthwise of the vehicle to minimize the width for road travel.

And yet another object is to provide a unique fluid jack which may be employed to both raise and lower the rack for the desired spraying height and also turn the rack to its desired travel position.

And still another object of this invention is to provide a special farm vehicle containing the apparatus of this invention which may freely move through certain crops such as cotton without damaging even the larger stalks, and yet which vehicle and apparatus is instantly suitable for highway travel.

And another object of this invention is to provide an apparatus by which a much larger farm crop acreage may be dusted or sprayed than has heretofore been possible with a land vehicle, and by which a greater volume of spraying material may be carried on each trip than heretofore utilized in either a land or air machine.

These and other objects and inventions will become apparent from an examination of the following specification and drawing in which:

Fig. 4 is a side elevational view of the apparatus shown in Fig. 3.

Fig. 5 is a top plan view of the apparatus of Figs. 3 and 4.

Fig. 6 is an elevational view partly in section of the main fluid jack employed in this invention.

Fig. 7 is a detail view in section of the cylinder only of Fig. 6.

Fig. 8 is a plan view taken in section along the lines 8—8 of Fig. 6.

Fig. 9 is an enlarged fragmentary detail view in section of the slot and bearing arrangement of Fig. 8.

Fig. 10 is sectional view of the rack taken along the lines 10—10 of Fig. 5 and showing an auxiliary tank installed.

Fig. 11 is a schematic view of the fluid lifting and lowering control system.

Fig. 12 is a sectional elevational view of a modified tank arrangement from the tank shown in Fig. 10, and showing a granular discharge device therein.

Fig. 13 is a plan view of the duct arrangement used with the discharge device of Fig. 12.

Fig. 14 is a detail side view of the rack warning light.

Fig. 15 is a detail rear view of the light of Fig. 14.

Fig. 16 is an outline view of the main tank when fluid materials are used.

Fig. 17 is an outline plan view of a modified tank arrangement of this invention.

Fig. 18 is a side elevational view of another embodiment of this invention showing the vehicle in its travelling position.

Fig. 19 is side elevational view of the device of Fig. 18 wherein the dust spraying rack has been turned transversely of the vehicle preparatory to its lowering.

Fig. 20 is a side elevational view of the device of Fig. 19 wherein the rack has been lowered to one operating position.

Fig. 21 is a plan view of one conventional wheel of the vehicle of Figs. 18–20.

Fig. 22 is a cross sectional view showing the installation of a special wheel for farm use on the axle of the vehicle of Figs. 18–20.

Fig. 23 is a cross sectional view of the extension member taken along the lines 23—23 of Fig. 22.

Figure 1:
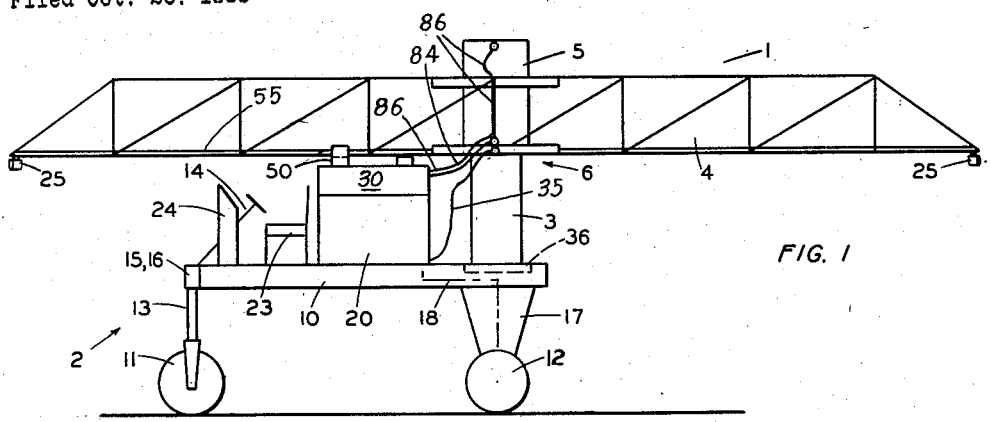
Fig. 1 represents a side elevational view of the complete apparatus of this invention in its road travelling position.

Referring now more particularly to the characters of reference on the drawing, the complete mobile dust spraying apparatus of this invention is indicated at 1 in Figs. 1–5. The apparatus 1 consists basically of a vehicle 2, near the rear of which is rigidly positioned an upstanding piston 3, and a dust spraying rack 4 integrally attached to a cylinder 5 which combines with piston 3 to form a fluid jack 6.

Figure 2:
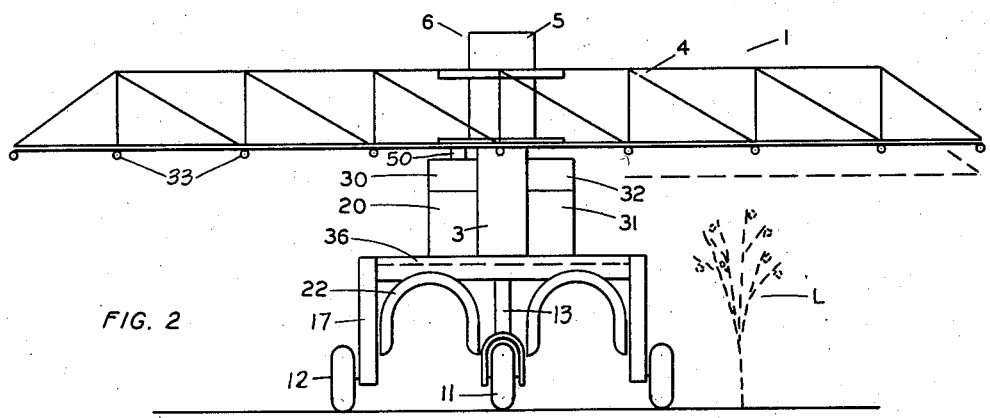
Fig. 2 represents a rear elevational view of the apparatus of this invention with the dust rack in the position required when used with large farm crops.
Figure 3:
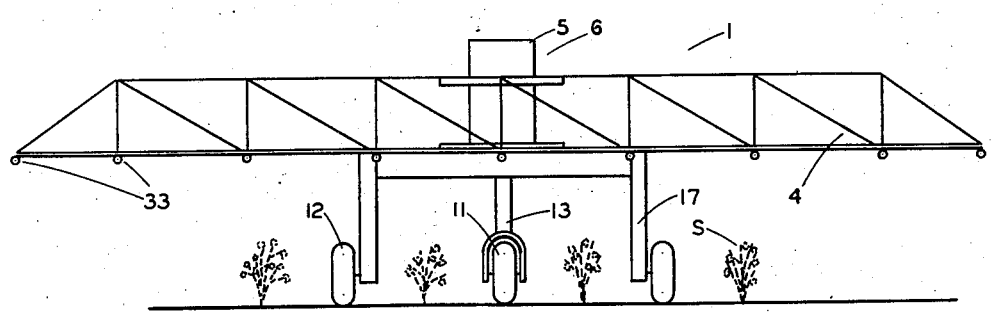
Fig. 3 is similar to Fig. 2 except the dust rack here is in the position required for small crops.

The vehicle 2 includes a main frame 10 which is supported from the ground by pneumatic wheels 11 and 12. Steerable wheel 11 is free rolling within a forked yoke 13 which is steered from a steering column 14 through a universal box 15 and a gear box 16. The drive wheels 12 are supported from a vertically extending chain housing 17 and are powered through a power train indicated generally at 18 from an internal combustion engine 20 mounted on frame 10. The lateral spacing of wheels 11 and 12 is shown in Fig. 3 to be such that the wheels roll in the furrows between the crop hills, and this factor combined with the high positioning of main frame 10 permits the machine to pass over many cotton plants such as indicated at S in Fig. 3 without disturbing the stalk or bolls. Where large cotton plants are encountered a guide shield 22 may be employed as shown in Figs. 2 and 4 which will guide the large plants L under the frame 10 without damaging the plants. The operator may sit in seat 23 at the left hand side of the forward portion of the vehicle 2 and adjacent the control panel 24. Conventional accessories and controls normally associated with a vehicle may be included with this vehicle but are not shown to avoid complicating the drawing. One such accessory which is shown are front and rear warning lights 25 for road travel. These lights, however, have a modified structure and differentiate somewhat from conventional use. By employing a warning light shown at 25 in Figs. 14 and 15, which has an open window 27 at its rear as well as the conventional downward facing window 28, then, when the rack 4 is in operating position, the operator will be able to determine the lateral position of the ends of rack 4 when operating at night. This determination is necessary when operating close to a fence or trees as often encountered in field operation. The lights 25, of course, play their conventional role when the rack 4 is in its travelling position.

In addition to the conventional engine 20 installed on vehicle 2, certain additional power units are required when this vehicle is intended for use in carrying out the teachings of this invention. A fluid pump or compressor indicated generally at 30 is installed and may be self-powered or driven from engine 20. The purpose of pump 30 is to provide pressurized fluid for operation of jack 6 in a manner to be described hereinafter. Adjacent engine 20 is located a tank 31 which contains the material which is to be sprayed by the apparatus of this invention. Above tank 31 is a pressurizer unit 32 which causes the material to be delivered from tank 31 to its ultimate point of expulsion from the apparatus which is by way of nozzles 33. Unit 32 may be any of several devices for the purpose, such as motor-compressor 34 of Fig. 16, which delivers air pressure to the sealed interior of tank 31 to force liquid material M thru hose 35 to nozzles 33.

Fig. 16 of the drawing shows the method that liquid insecticide is handled in this device. The liquid M fills tank 31 to liquid level LL. Motor-compressor 34 delivers pressurized air through discharge tube 88 into the top area of tank 31 causing liquid M to be forced under pressure through tank outlet 89 into discharge hose 35.

The material referred to may be in a liquid, powder or gaseous form and may be of a composition such that it acts to increase plant growth such as for example a fertilizing agent, or it may be a composition of matter useful in destroying insect life. Since the use of this apparatus may be for any purpose to which its construction is suitable, such as for applying fertilizer to crops, for wetting down the fertilizer after application, and for applying insecticide, the description will be understood to refer where applicable to any of its uses, altho the description in this specification will be largely confined to the primary function of this device which is to spray insecticide over farm crops, such as cotton, in large scale operations. This spraying operation will have the effectiveness of airplane dusting, but will be much more economical both as to maintenance and operating cost, and may be accomplished with infinitely greater safety to the life of the operator.

The details of the structure of the dust spraying portion of this apparatus may be examined by starting with rear beam 36 which connects the sides of frame 10 and itself forms the mounting for piston 3, which is attached to beam 36 at its midpoint, and extends vertically upward therefrom. Piston 3 as seen in Fig. 6 extends through opening 37 of beam 36 and is welded at 38 to provide a rigid structure. A piston head 40 at the upper end of piston 3 permits cylinder 5 to be raised or lowered under pressure and by controlled means. Head 40 includes a radially projecting stub shaft 41 (Fig. 9) to which is journalled a ball bearing roller 42. Cylinder 5 includes an internal guide track 43 which extends vertically through most of its length but veers off sharply at the bottom portion 43A. Ports 44 and 45 above and below head 40 are made to introduce fluid to the interior of cylinder 5 by means of a valve 81 on the operators control panel 24. The lower end 46 of cylinder 5 includes an opening 47 through which piston 3 is guided and may freely slide. Surrounding opening 47, a non-metallic seal 48 snugly engages piston 3 to prevent the leakage of fluid from within the cylinder 5 and also to prevent the entrance of foreign matter into the cylinder. Rack 4 is rigidly attached to the outer surface of cylinder 5 so that any movement imparted to cylinder 5 will result in a similar movement to rack 4. For example when pressurized fluid enters port 44, it creates a pressure against head 40 and top 49 of cylinder 5 which causes the cylinder and rack 4 to rise. Roller 42 in track 43 restricts the movement of cylinder 5 to a straight vertical direction until roller 42 enters the inclined portion 43A of the track, after which cylinder 5 and rack 4 continue to rise but also turn sharply until rack 4 reaches the position 4A of Fig. 5. At this position roller 42 has reached the lower end of track portion 43A and rack 4 has abutted stop 50 on the top surface of unit 32. A latch 51 (Fig. 11) pivoted at 59 to stop 50 automatically locks the rack in position 4A for safety purposes during road travel. This latch 51 is automatically released when pressure is applied to port 45 to lower cylinder 5 as shown schematically in Fig. 11. A small release cylinder 52 includes a normally expanded spring 53 which acts against piston 54 which is pivoted at 54A to latch 51 to cause latch 51 to assume a downward position. As lower truss member 55 of rack 4 is moved toward stop 50 it strikes tapered portion 56 of latch 51 which causes latch 51 to raise and compress spring 53; as soon as member 55 has reached stop 50, latch 51 under pressure from spring 53 is free to grip member 55 in holding relation. However when the operator directs pressurized fluid to the lower port 45 for specifically causing rack 4 to lower, a portion of this fluid is diverted to cylinder 52 and therein acts on piston 54 to compress spring 53 and thereby release latch 51. Since cylinder 52 is designed to operate on much less pressure than cylinder 5 the latch 51 should release just prior to movement of member 55. However, latch 51 is designed to permit manual release by way of extension 51A in case of necessity.

In order to utilize additional available space to provide a carrying capacity of additional spray materials the open interior of rack 4 is lined with auxiliary tanks 60 shown in Figs. 5 and 10. These tanks 60 are located on each side of jack 6 and may be operatively connected to pressurizer unit 32 through hose 61 indicated in its appropriate location in Fig. 5, and tanks 60 may also be connected thru hose 35A to nozzles 33. Solenoid valves 62 and 62A are normally closed to prevent unintentional discharge of material through nozzles 33, but each valve may be selectively opened by electric switches 94 on the operator's panel 24.

The above arrangement will work very satisfactory if liquid or gaseous materials are employed in tanks 31 or 60. However, when a granular or powdered material is employed it may be desirable to use a vacuum type spraying device 65 shown in Fig. 12 and a slightly modified dust manifold 68. The device 65 is similar to a conventional tank type vacuum cleaner except there is no dust retainer bag to prevent the dust from being picked up through its intake nozzle 66 and being blown from the discharge end 67 which connects directly with a special dusting manifold 68 on rack 4. Tank 31A (Fig. 12) includes a hopper 70 which is filled with granular particles P which gravitate to the lower opening 71 of the hopper 70 and fill retainer pocket 72 which is bounded on one side by fence 73 and on the other by angularly inclined grate 74 which is of an open mesh construction and will permit air, but not particles P to pass. Manifold 68 is shown in plan view in Fig. 13, and it will be observed that each nozzle 76 includes a baffle 77 that is proportionate to its distance from the inlet connection 67 so that some particles in the air stream (as shown by arrows A) will be distributed at each nozzle. Intake 66 includes a mesh-type guard 79 which prevents the intake from becoming clogged during use.

In operation, the rack 4 is in position shown by phantom lines 4A of Fig. 5 when travelling between jobs, and ordinarily enters the cotton field to be sprayed in this condition. When the wheels 11 and 12 of vehicle 2 have been aligned lengthwise with the furrows of the cotton patch, the operator moves control handle 80 to "down" position which causes valve 81 to direct fluid under pressure from supply line 82 thru channel 83 to line 84 connected with down port 45 of cylinder 5 so that fluid will be delivered simultaneously to lower cylinder 5 and, through branch line 84A, to release latch 51 as previously described. At this position a second channel 85 connects the up line 86 with return line 87 so that pressurized fluid enters port 45, inactive fluid may leave port 44 and return to the pump 30. With the valve in this position, fluid will enter port 45 and cylinder 5 and rack 4 will first rotate 90° due to track 43A and then will lower vertically until rack 4 rests on vehicle frame 10. When handle 80 is moved to the "up" position, channel 83 will then connect supply line 82 with the "up" line 86 and channel 85 will connect the down line 84 with return line 87. This action will cause cylinder 5 and rack 4 to first rise vertically and then rotate 90° from its original postion to the position shown in phantom at 4A. The desired height of nozzles 33 or rack 4 is just above the top of the crops, and since the height of crops vary in different localities as indicated at L and S, it is desirable that the vertical position of rack 4 be capable of being set at the proper height. This is accomplished by moving control handle 80 to the "hold" position which traps fluid in cylinder 5 and consequently prevents any further movement of the cylinder or rack. This "hold" position may be engaged during either up or down movement of rack 4.

If the tanks 31 and 60 are enlarged to their maximum capacity the volume of material that apparatus I will be able to transport and dispense is considerably in excess of conventional vehicles. This capacity as indicated by enlarged tanks 90 and 91 of Fig. 17 will be especially valuable when this apparatus is used for water sprinkling or irrigation purposes. In this embodiment, a separate liquid pump 92 is supplied including a long suction hose 93 so that water may be taken from a river, well, or reservoir and used to fill the enlarged tanks 90 and 91.

In the embodiment shown in Figs. 18–23, a standard highway truck 100 has been utilized as the basic vehicle. This truck is supported for highway travel on conventional wheels 101. However, when this vehicle 100 is driven into a plowed field it is found that the small wheels 101 have a tendency to bog down in damp soil, and also that the lateral spacing of the wheels 101 does not correspond to the spacing of the furrows of farm crops. In case of small height crops, the basic vehicle might be used without modification if the farmer planted his crop in rows to correspond to the wheel spacing. However, in the majority of operations certain changes will be necessary to convert this basic vehicle 100 into a farm vehicle when the spraying apparatus of this invention is intended for farm use. In order to raise the frame 102 of the vehicle above the ground a sufficient distance so that plant stalk may pass under the vehicle, large wheels 103 will replace the conventional wheels 101, and a stalk guide 161 is installed under the frame 102, as shown in Figs. 18–20.

To install wheels 103 at the proper lateral spacing on a conventional axle such as 105, an axle extension 110 is required. This extension 110 includes a cylindrical body 116 having flanges 117 and 118 at each end thereof. Flange 117 includes a bolt circle 119 to cooperate with studs 120 of axle 105, and flange 118 includes a stud circle 125 which duplicates studs 120 at the desired lateral distance from the vehicle frame 102. By thus extending axle 105 beyond the frame 102 a much larger wheel 103 may be installed than would fit within the wheel well 127.

The dust spraying apparatus of this embodiment is indicated geenrally at 130 of vehicle 100. A cylinder 132 is pivoted at 133 to bracket 134 mounted on bed 131. A rod 135 is installed in cylinder 132 for limited rotary but not longitudinal movement by means of ball 140 and retainer ring 141 which engages groove 142 or rod 135. A triangular, cross sectional truss-reinforced dust dispensing rack 143 is rigidly attached to the top end of rod 135 so that rack 143 is subjected to the same movement imparted to cylinder 132 or rod 135. A pair of two-way fluid jacks 144 are pivotally attached as at 152 to rack 143 and at 151 to cylinder 132. It will be observed that the movement of jacks 144 is limited so that fluid pressure causes the jacks to rotate rack 143 through an arc of 90° from a longitudinal position relative to the truck 100 for travelling purposes to a transverse position for operational purposes. Due to stop pins 150, jacks 144 stop just short of dead center (vertical in Fig. 19) so that they will operate to rotate rack 143 in either direction.

When rack 143 has been rotated to its transverse position (Fig. 19) it is then ready to be lowered by reversible winch 155 and cable system 156 to whatever vertical distance it is desired to set the rack (for example position A shown in phantom outline). The usual position, however, will be that shown in Fig. 20 wherein rack 143 of spray apparatus 130 rests on truck bed 131. The material dispensing equipment used with this embodiment may be that shown in the first embodiment or any known conventional equipment for the purpose. A hose or duct line 158 connects supply tank 159 and dust manifold 160 by any convenient routing preferably around the outside of cylinder 132 since the lower inside portion of cylinder 132 will contain a grease to lubricate ball 140.

A heavy duty jack (not shown) may be carried on truck bed 131 to facilitate the wheel conversion operation and with such a jack it will be only necessary to lift the front and rear end once to change each pair of wheels. A plant guard 161 extends lengthwise under vehicle 100 to prevent damage to crops which pass under frame 102 when the vehicle is in use.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention as defined in the appended claims.

Having thus described my invention, what I claim as new and useful and desire to secure by Letters Patent is:

1. A dust spraying apparatus comprising a vehicle including a frame, lifting and turning means attached to said frame, a dust rack extending a greater width than said vehicle attached to said means, and control means on said vehicle and operatively connected with said first named means to cause said first named means to lift said rack vertically and rotate said rack from a transverse to a longitudinal position relative to the direction of travel of said vehicle said rack remaining substantially horizontal at all positions of lift.

2. A dust spraying apparatus comprising: a vehicle including a frame, power lifting and turning means attached to said frame, a dust rack having a greater width than said vehicle attached to said means, and power control means on said vehicle and operatively connected with said first named means to cause said first named means to both lift said rack vertically and rotate said rack from a transverse to a longitudinal position relative to the direction of travel of said vehicle said rack remaining substantially horizontal at all positions of lift.

3. A material dispensing apparatus comprising: a vehicle including a frame, lifting and turning means attached to said frame, a dispensing rack extending during operation to a greater width than said vehicle and rigidly attached to said means and movable therewith, and a second means on said vehicle and operatively connected to said first named means to cause said first named means to both lift said rack vertically and rotate said rack from its operating position to a position longitudinal of said vehicle said rack remaining substantially horizontal at all positions of lift.

4. A material dispensing apparatus comprising: a vehicle including a frame, a power plant on said vehicle, lifting and turning means attached to said frame, a dispensing rack extending during operation to a greater width than said vehicle rigidly attached to said means and movable therewith, and a second means on said vehicle and operatively connected to said first named means to cause said first named means to both lift said rack vertically and rotate said rack from its operating position to a position longitudinal of said vehicle and overlying said power plant said rack remaining substantially horizontal at all positions of lift.

5. A material dispensing apparatus comprising: a vehicle including a frame, a lifting and turning means attached to said frame, a dispensing rack extending transversely of said vehicle during operation to a width considerably greater than the width of said vehicle, said rack rigidly attached and movable with said means, and a second means on said vehicle and operatively connected to said first named means to cause said first named means to first lift said rack a substantial distance and then rotate said rack to a longitudinal position relative to the direction of travel of said vehicle said rack remaining substantially horizontal at all positions of lift.

6. A material dispensing apparatus comprising: a vehicle including a frame, lifting and turning means attached to said frame, a dispensing rack extending transversely of said vehicle during operation to a width considerably greater than the width of said vehicle, said rack attached to and movable with said means, and control means on said vehicle and operatively connected to said first named means to cause said rack to lift to and stop at any desired vertical position of said first named means, said control means further operative to cause said rack to lift to a predetermined vertical height and then rotate lengthwise of said vehicle said rack remaining substantially horizontal at all positions of lift.

7. A material dispensing apparatus comprising: a vehicle having a frame, a vertical piston attached to said frame, a cylinder associated with said piston and adapted to move vertically relative thereto, a dispensing rack attached to said cylinder and movable therewith, and control means on said vehicle and operatively connected to said first named means to cause said cylinder and rack to move vertically with respect to said vehicle.

8. A material dispensing apparatus comprising: a vehicle having a frame, a vertical piston attached to said frame, a cylinder associated with said piston and adapted to move vertically relative thereto, a dispensing rack attached to said cylinder and movable therewith, and control means on said vehicle and operatively connected to said first named means to cause said cylinder and rack to move vertically up or down said piston and to stop at any desired position of height relative to the ground and within the operational limits of said cylinder.

9. A material dispensing apparatus comprising: a vehicle having a frame, a vertical piston attached to said frame, a cylinder associated with said piston and adapted to move vertically relative thereto, a dispensing rack attached to said cylinder and movable therewith, and control means on said vehicle and operatively connected to said first named means to cause said cylinder and rack to move vertically with respect to said vehicle, means between said cylinder and piston to cause said cylinder and rack to move vertically to a predetermined height and thereafter to rotate about said piston.

10. A material dispensing apparatus comprising: a vehicle having a frame, a single vertical piston attached to said frame, a cylinder associated with said piston and adapted to move vertically relative thereto, a dispensing rack attached to said cylinder and movable therewith, said rack extending transversely of said vehicle when in its operating position, and control means on said vehicle and operatively connected to said first named means to cause said cylinder and rack to move vertically up or down said piston and to stop at any desired position of height relative to the ground and within the operational limits of said cylinder, and further application of said control means in an up direction causing said cylinder and rack to rotate about said piston and to extend longitudinal with said vehicle for travel purposes.

11. A material dispensing apparatus as in claim 10 characterized by the inclusion of locking means to secure said rack in its longitudinal position.

12. A material dispensing apparatus as in claim 9 characterized by the fact that said cylinder includes an internal track and said piston includes a projecting guide means engaging said track whereby the external movement of said cylinder and rack follows the internal movement of said guide means in said track.

13. A material dispensing apparatus as in claim 9 characterized by the fact that said cylinder includes an internal groove and said piston includes a shaft projecting into said groove, and a roller journalled on said shaft whereby said roller is adapted to ride in said groove and guide the movement of said cylinder relative to said piston.

14. A material dispensing apparatus comprising: a vehicle having a frame, a vertical piston attached to said frame, a cylinder associated with said piston and adapted to move vertically relative thereto, a dispensing rack attached to said cylinder and movable therewith, and control means on said vehicle and operatively connected to said first named means to cause said cylinder and rack to move up or down selectively; turning means operative to cause said cylinder and rack to rotate, and locking means operative to automatically lock said rack at one position of rotation.

References Cited in the file of this patent

UNITED STATES PATENTS

| | | |
|---|---|---|
| 1,321,412 | Barney | Nov. 11, 1919 |
| 1,736,419 | Smith | Nov. 19, 1929 |
| 2,551,286 | Poetker | May 1, 1951 |
| 2,691,236 | Tuft | Oct. 12, 1954 |
| 2,712,198 | Smith | July 5, 1955 |

FOREIGN PATENTS

| | | |
|---|---|---|
| 361,082 | Great Britain | Nov. 19, 1931 |
| 453,980 | Great Britain | Sept. 22, 1936 |